United States Patent
Erlandsson et al.

(10) Patent No.: US 6,767,051 B2
(45) Date of Patent: Jul. 27, 2004

(54) HINGE APPARATUS FOR VEHICLE FLOOR SYSTEMS

(75) Inventors: Per Erlandsson, Skara (SE); Duane Poliquin, Brighton, MI (US); Sture Andersson, Harestad (SE)

(73) Assignee: Collins and Aikman Products Co., Troy, MI (US)

( * ) Notice: Subject to any disclaimer, the term of this patent is extended or adjusted under 35 U.S.C. 154(b) by 0 days.

(21) Appl. No.: 10/661,803

(22) Filed: Sep. 12, 2003

(65) Prior Publication Data

US 2004/0051335 A1 Mar. 18, 2004

Related U.S. Application Data

(62) Division of application No. 10/331,842, filed on Dec. 30, 2002, now Pat. No. 6,719,363.
(60) Provisional application No. 60/410,089, filed on Sep. 12, 2002.

(51) Int. Cl.[7] .................................................. B60J 7/00
(52) U.S. Cl. ........................ 296/193.07; 16/225; 52/71; 160/229.1
(58) Field of Search .............................. 296/193.07, 39, 296/69, 23, 37.16, 65, 97.23, 37.3, 39.1, 204, 100.07, 191, 203.02, 107.09, 146.14; 16/284, 354, 225; 52/241, 71; 5/99.1; 160/229.1; 109/56; 434/408; 427/583

(56) References Cited

U.S. PATENT DOCUMENTS

| | | |
|---|---|---|
| 1,251,865 A | 1/1918 | Colvin |
| 2,898,146 A | 8/1959 | Yudenfreund ................. 296/39 |
| 3,317,238 A | 5/1967 | Smoll ........................... 296/69 |
| 3,476,432 A | 11/1969 | Aliment et al. ............... 296/23 |
| 3,695,330 A * | 10/1972 | Hasbrouck ................... 16/225 |
| 3,871,283 A * | 3/1975 | John ........................... 109/56 |
| 3,913,656 A * | 10/1975 | Guyer ...................... 160/229.1 |
| 4,029,834 A | 6/1977 | Bartlett ........................ 428/62 |
| 4,242,846 A * | 1/1981 | Hurd et al. .................... 52/71 |
| 4,263,761 A * | 4/1981 | Kristoff ....................... 52/241 |
| 4,279,439 A | 7/1981 | Cantieri ....................... 296/39 |
| 4,351,555 A | 9/1982 | Hashimoto ............... 296/37.16 |
| 4,381,324 A | 4/1983 | Ellingson, Jr. ............... 428/58 |
| 4,382,986 A | 5/1983 | Reuben ....................... 428/88 |
| 4,443,034 A | 4/1984 | Beggs .......................... 296/65 |
| 4,450,883 A * | 5/1984 | Fischer .................... 160/229.1 |
| 4,568,587 A | 2/1986 | Balzer ......................... 428/52 |
| 4,679,277 A * | 7/1987 | Shibata ....................... 16/354 |
| 4,799,727 A * | 1/1989 | Robbins et al. ........ 296/146.14 |
| 4,848,826 A | 7/1989 | Kuwabara et al. ....... 296/97.23 |
| 4,922,987 A * | 5/1990 | Marontate et al. .......... 160/183 |
| 5,279,867 A * | 1/1994 | Friedt et al. ................ 427/583 |
| 5,322,335 A | 6/1994 | Niemi ..................... 296/97.23 |
| 5,355,555 A * | 10/1994 | Zarelius ....................... 16/225 |
| 5,502,930 A * | 4/1996 | Burkette et al. ............ 160/135 |
| 5,636,893 A * | 6/1997 | Wheatley et al. ...... 296/100.09 |
| 5,842,730 A | 12/1998 | Schneider et al. ......... 296/37.3 |
| 6,017,074 A | 1/2000 | Biskup ....................... 296/39.1 |
| 6,102,464 A | 8/2000 | Schneider et al. ......... 296/37.3 |
| 6,161,255 A * | 12/2000 | Garrett ........................ 16/284 |
| 6,170,900 B1 * | 1/2001 | Kooiker ................. 296/107.09 |
| 6,290,278 B1 | 9/2001 | Loveland ................... 296/39.1 |
| 6,318,783 B1 | 11/2001 | Knox ........................ 296/39.1 |
| 6,406,085 B1 | 6/2002 | Stanesic .................. 296/97.23 |
| 6,582,236 B1 * | 6/2003 | Dian et al. .................. 434/408 |
| 6,588,033 B1 * | 7/2003 | Welsh et al. ................. 5/99.1 |

FOREIGN PATENT DOCUMENTS

| DE | 4303054 | 8/1993 |
|---|---|---|
| WO | WO 00/60191 | 10/2000 |

* cited by examiner

*Primary Examiner*—Kiran Patel
(74) *Attorney, Agent, or Firm*—Myers Bigel Sibley & Sajovec

(57) ABSTRACT

Hinges are provided for vehicle floor systems that include an elongated, planar bridge member, and opposite first and second hinge members pivotally attached to the bridge member. The first and second hinge members are each pivotally connected to a respective edge portion of the bridge member. Each hinge member includes a base member and a planar upper panel that extends outwardly from the base member. The upper panel of each hinge member is configured to removably secure a vehicle floor panel thereto. Each hinge member is movable between a first position wherein the upper panel may be substantially coplanar with the bridge member, and a second position wherein the upper panel is transverse to the bridge member. The width of the bridge member is at least twice the pile dimension or compressed pile dimension of overlying carpet to prevent damage to the carpet when the hinge members are pivoted.

15 Claims, 3 Drawing Sheets

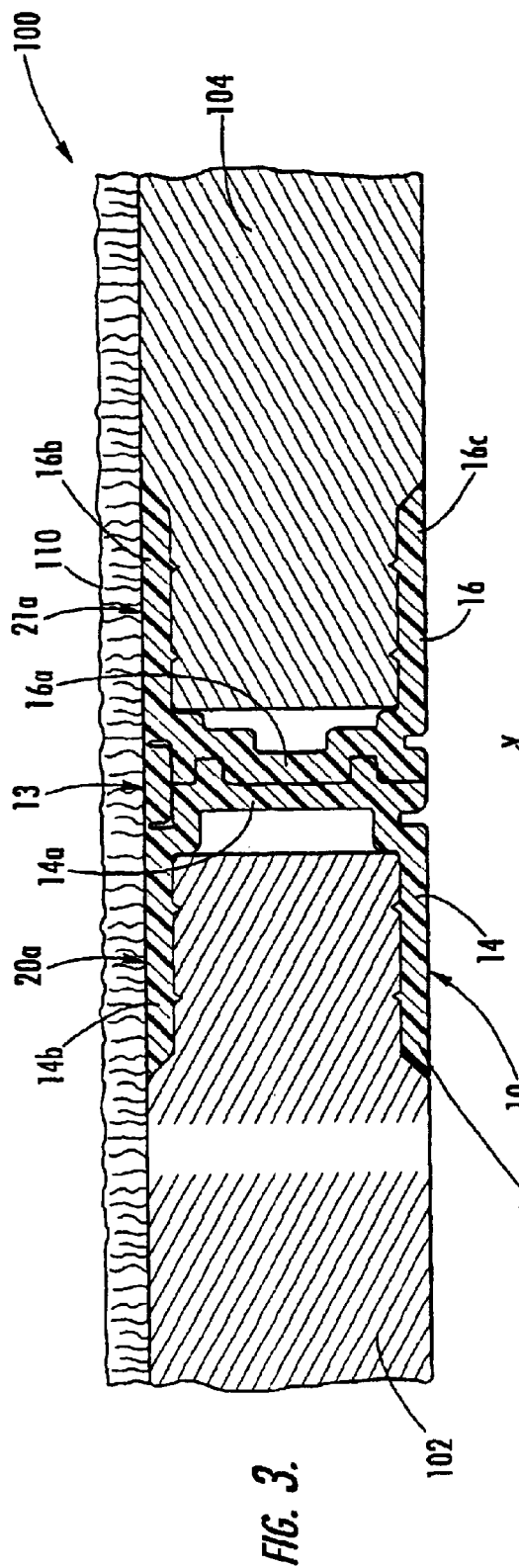
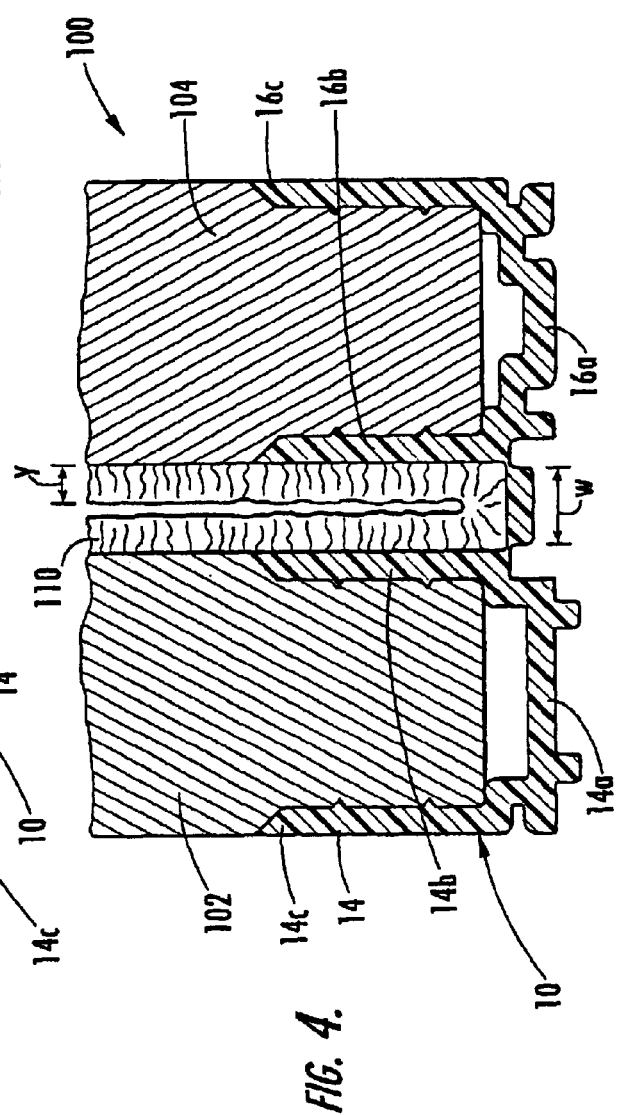
FIG. 3.
FIG. 4.

HINGE APPARATUS FOR VEHICLE FLOOR SYSTEMS

RELATED APPLICATION

This application is a Divisional application of U.S. patent application Ser. No. 10/331,842 filed Dec. 30, 2002, now U.S. Pat. No. 6,719,363, which issued on Apr. 13, 2004, entitled "Hinge Apparatus For Vehicle Floor Systems", commonly assigned to Collins & Aikman Products Co, and which is incorporated herein by reference in its entirety.

FIELD OF THE INVENTION

The present invention relates generally to vehicles and, more particularly, to floor systems within vehicles.

BACKGROUND OF THE INVENTION

Motor vehicles are typically provided with a cargo storage compartment of some type. For example, sedan-style automobiles are conventionally equipped with a trunk. Sport/utility and mini-van vehicles are conventionally provided with a cargo storage area behind the last row of seating.

Vehicle cargo compartments often include a floor panel that overlies a spare tire compartment or additional storage space. Access to an area beneath a floor panel usually is provided by lifting an edge portion of the floor panel and pivoting the floor panel about a hinge. Unfortunately, floor panels may be covered with carpeting which may become pinched by conventional hinges or otherwise damaged from pivotal movement of the floor panel. In addition, vehicle manufacturers are constantly seeking components that are lighter in weight, inexpensive to manufacture, and that have increased strength. Accordingly, there is a need for a hinge that will allow vehicle floor panels to be pivoted without damaging an overlying carpet and that are inexpensive to manufacture.

SUMMARY OF THE INVENTION

In view of the above discussion, hinges for vehicle floor systems are provided that include an elongated, planar bridge member, and opposite first and second hinge members, each pivotally attached to the bridge member. The bridge member has opposite first and second edge portions and a surface. The first and second hinge members are each pivotally connected to a respective one of the first and second edge portions of the bridge member. Each hinge member includes a base member and a planar upper panel that extends outwardly from the base member. The upper panel of each hinge member is configured to removably secure a vehicle floor panel thereto.

Each hinge member is movable between a first position wherein the upper panel may be substantially coplanar with the bridge member, and a second position wherein the upper panel is transverse to the bridge member. The base members of the hinge members are in adjacent, contacting relationship when the first and second hinge members are both in the first position. The width of the bridge member between the first and second edge portions is selected to be at least twice the pile dimension (or at least twice the compressed pile dimension) of a carpet overlying the hinge. This design criteria can reduce damage to a carpet when the hinge members are moved between first and second positions.

According to embodiments of the present invention, the upper panel of each hinge member includes opposite first and second surfaces, and the first surface of each hinge member is substantially flush with the bridge member surface when the hinge member is in the first position.

According to embodiments of the present invention, the base members of the first and second hinge members interlock with each other when the first and second hinge members are both in the first position. This provides structural rigidity and strength to the hinge.

According to embodiments of the present invention, each hinge member may include a lower panel that extends outwardly from the base member in spaced-apart, opposing relationship with the upper panel. The upper and lower panels of each hinge member are configured to removably secure a vehicle floor panel therebetween. The lower panels of the hinge members may be substantially coplanar when both hinge members are in respective first positions.

According to embodiments of the present invention, a vehicle floor system includes a hinge apparatus as described above, a pair of floor panels, each secured to a respective one of the hinge member upper panels, and a floor covering material (e.g., carpet) supported by the floor panels and by the hinge.

BRIEF DESCRIPTION OF THE DRAWINGS

FIG. 3 is a side elevational view of a vehicle floor system according to embodiments of the present invention, wherein the hinge members are in respective first positions.

FIG. 4 illustrates the vehicle floor system of FIG. 3 wherein the hinge members are in respective second positions.

DETAILED DESCRIPTION OF THE INVENTION

Figure 1:
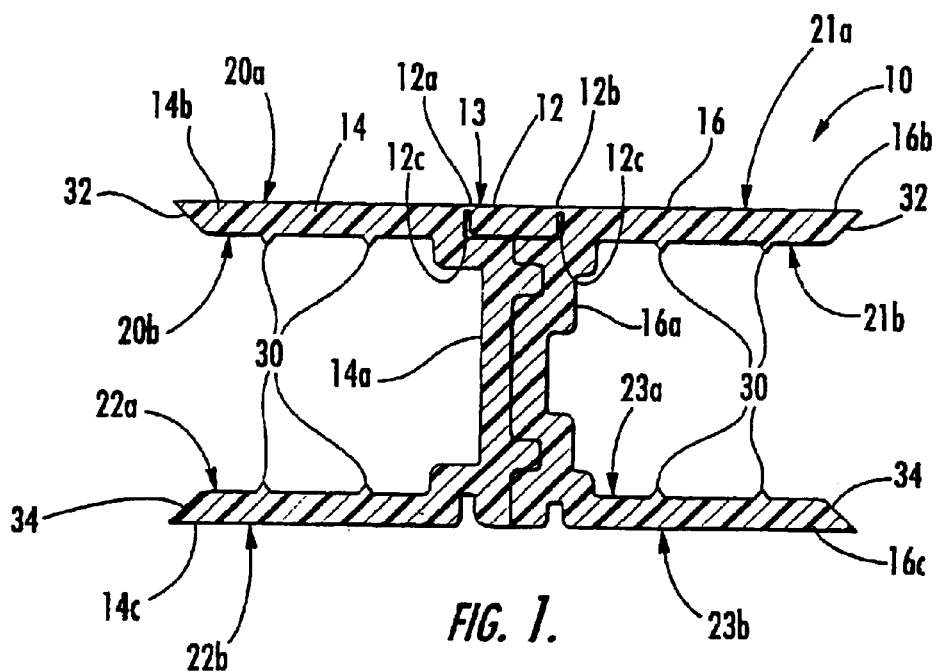
FIG. 1 is a side elevational view of a hinge apparatus according to embodiments of the present invention, wherein the hinge members are in respective first positions.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Figure 2:
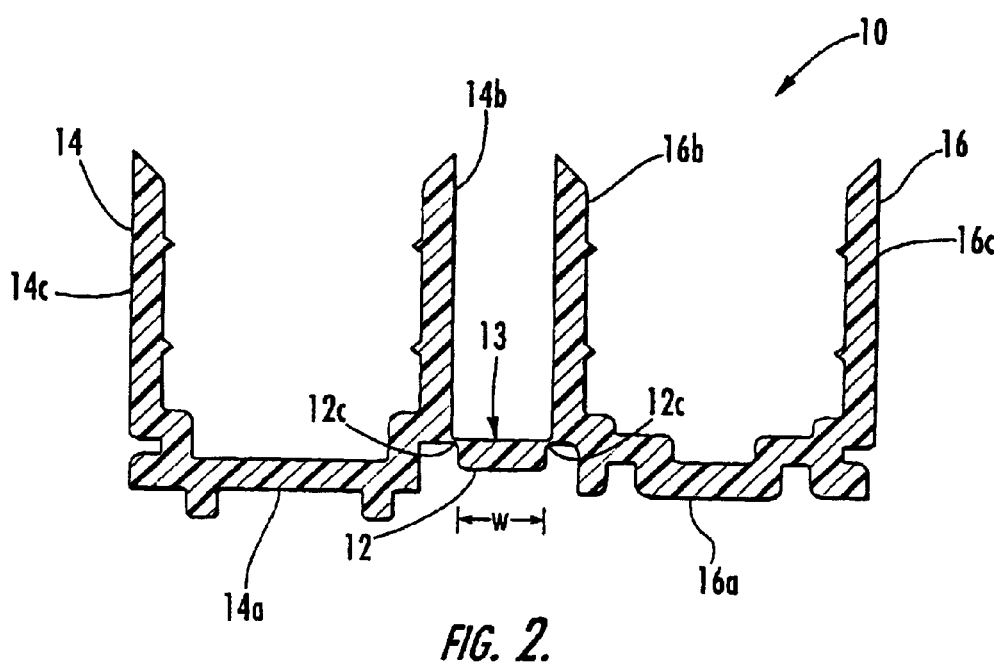
FIG. 2 illustrates the hinge apparatus of FIG. 1 wherein the hinge members are in respective second positions.

Referring to FIGS. 1–2, a hinge apparatus 10 for a vehicle floor system, according to embodiments of the present invention, is illustrated. The hinge apparatus 10 includes an elongated, planar bridge member 12, and opposite first and second hinge members 14, 16. The bridge member 12 includes opposite first and second edge portions 12a, 12b and an upper surface 13. Each hinge member 14, 16 is pivotally connected to a respective one of the first and second edge portions 12a, 12b of the bridge member 12. In the illustrated embodiment, hinge member 14 is pivotally connected to the bridge member first edge portion 12a, and hinge member 16 is pivotally connected to the bridge member second edge portion 12b.

Each hinge member 14, 16 has a base member 14a, 16a and a generally planar upper panel 14b, 16b extending outwardly from the respective base member 14a, 16a, as illustrated. Each hinge member 14, 16 is movable between a first position wherein the upper panel 14b, 16b is substantially coplanar with the bridge member 12 (FIG. 1), and a second position wherein the upper panel 14b, 16b is transverse to the bridge member 12 (FIG. 2). According to embodiments of the present invention, the base members 14a, 16a of the hinge members 14, 16 are in adjacent, contacting relationship when both hinge members 14, 16 are in the first position (FIG. 1). In the illustrated embodiment, the base members 14a, 16a of the hinge members 14, 16 interlock with each other when both hinge members 14, 16 are in the first position (FIG. 1). The interlocking of the base members 14a, 16a adds structural strength and rigidity to the hinge apparatus 10. The base members 14a, 16a, when interlocked, serve the function of a support beam and can support or transfer the weight of floor covering materials (e.g., carpet) and/or other materials and loads placed on the hinge apparatus 10 or on a vehicle load floor associated therewith.

The upper panel 14b, 16b of each hinge member 14, 16 includes opposite first and second surfaces 20a, 20b and 21a, 21b, respectively. The first surface 20a, 21a of each upper panel 14b, 16b may be substantially flush with the bridge member surface 13 when the respective hinge member 14, 16 is in the first position (FIG. 1). However, it is not required that the first surface 20a, 21a of each upper panel 14b, 16b be substantially flush with the bridge member surface 13 when the respective hinge member 14, 16 is in the first position. In the illustrated embodiment, the second surface 20b, 21b of each upper panel 14b, 16b has a plurality of projections 30 extending therefrom. These projections 30 are utilized to facilitate securing a floor panel (e.g., 102, 104 of FIGS. 3–4) to the upper panels 14b, 16b via, for example, ultrasonic welding.

In the illustrated embodiment, each hinge member 14, 16 includes a lower panel 14c, 16c that extends outwardly from the base member 14a, 16a in spaced-apart, opposing relationship with the upper panel 14b, 16b. The lower panels 14c, 16c of the hinge members 14, 16 are substantially coplanar when both hinge members 14, 16 are in respective first positions.

The upper and lower panels 14b, 14c and 16b, 16c of the respective hinge members 14, 16 are configured to removably secure a vehicle floor panel therebetween. The lower panel 14c, 16c of each hinge member 14, 16 includes opposite first and second surfaces 22a, 22b and 23a, 23b, respectively. The first surface 22a, 23a of each lower panel 14c, 16c has a plurality of projections 30 extending therefrom. These projections 30 are utilized to facilitate securing a floor panel (e.g., 102, 104 of FIGS. 3–4) to the lower panels 14c, 16c via, for example, ultrasonic welding.

In the illustrated embodiment, the upper panel 14b, 16b of each hinge member 14, 16 has a tapered free end 32, and the lower panel 14c, 16c of each hinge member 14, 16 has a tapered free end 34. The tapered free ends 32, 34 can facilitate insertion of floor panels between the upper and lower panels 14b, 14c and 16b, 16c, respectively.

Figure 1A:
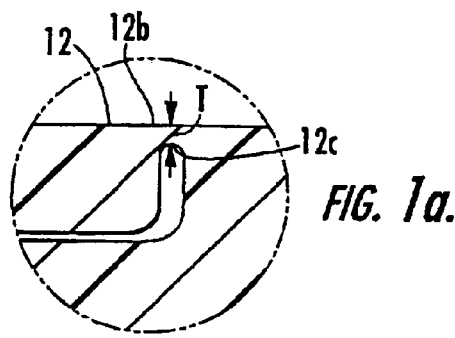
FIG. 1a is an enlarged view of the web of material connecting a hinge member to the bridge member.

According to embodiments of the present invention, each hinge member 14, 16 is pivotally attached to a respective bridge member edge portion 12a, 12b via a web 12c of material having a thickness T (FIG. 1a) of less than about one millimeter (1 mm). However, web 12c may have various thicknesses without limitation. In addition, each hinge member 14, 16 may be pivotally attached to a respective bridge member edge portion 12a, 12b in various ways.

According to embodiments of the present invention a width W of the bridge member 12 between the first and second edge portions 12a, 12b is at least twice a pile dimension Y of a carpet supported by the hinge apparatus 10, as illustrated in FIG. 4. According to other embodiments of the present invention a width W of the bridge member 12 between the first and second edge portions 12a, 12b is at least twice a compressed pile dimension (not shown) of a carpet supported by the hinge apparatus 10. As known to those skilled in the art, the pile of a carpet can be compressed without degrading the function or aesthetics of the carpet. The term "compressed pile dimension", thus, means the dimension of a carpet that has its pile compressed by an amount that does not damage the carpet or negatively effect the aesthetics of the carpet.

The hinge apparatus 10 may be formed from various materials including polymeric materials, with polypropylene being a preferred material. Other materials that may be utilized include polyethylene, polyamide, polyoxymethylene (POM), etc., in their natural, filled, reinforced, or blended formulations. The hinge apparatus 10 may be formed via an extrusion process, but other thermoplastic or thermoset processes may be utilized. According to embodiments of the present invention, the hinge apparatus 10 is formed of recyclable material. Moreover, an entire vehicle floor system (hinge apparatus 10, carpet, load floor) may be recyclable.

According to embodiments of the present invention, each hinge member 14, 16 of the hinge apparatus 10 may require only a respective base member 14a, 16a and a respective upper panel 14b, 16b. As such, when each hinge member 14, 16 is in the first position, the hinge apparatus 10 has a generally T-shaped configuration.

Referring to FIG. 3, a vehicle floor system 100, according to embodiments of the present invention, includes the hinge apparatus 10 of FIGS. 1–2, a pair of floor panels 102, 104, each secured between a respective pair of upper and lower panels 14b, 14c and 16b, 16c of hinge members 14, 16, and a carpet 110 secured to the bridge member surface 13 and to the first surface 20a, 21a of the upper panels 14b, 16b.

As illustrated in FIG. 4, the carpet 110 includes pile having a dimension Y. The bridge member 12 has a width W between the first and second edge portions 12a, 12b that is at least twice the pile dimension Y.

Figure 5:
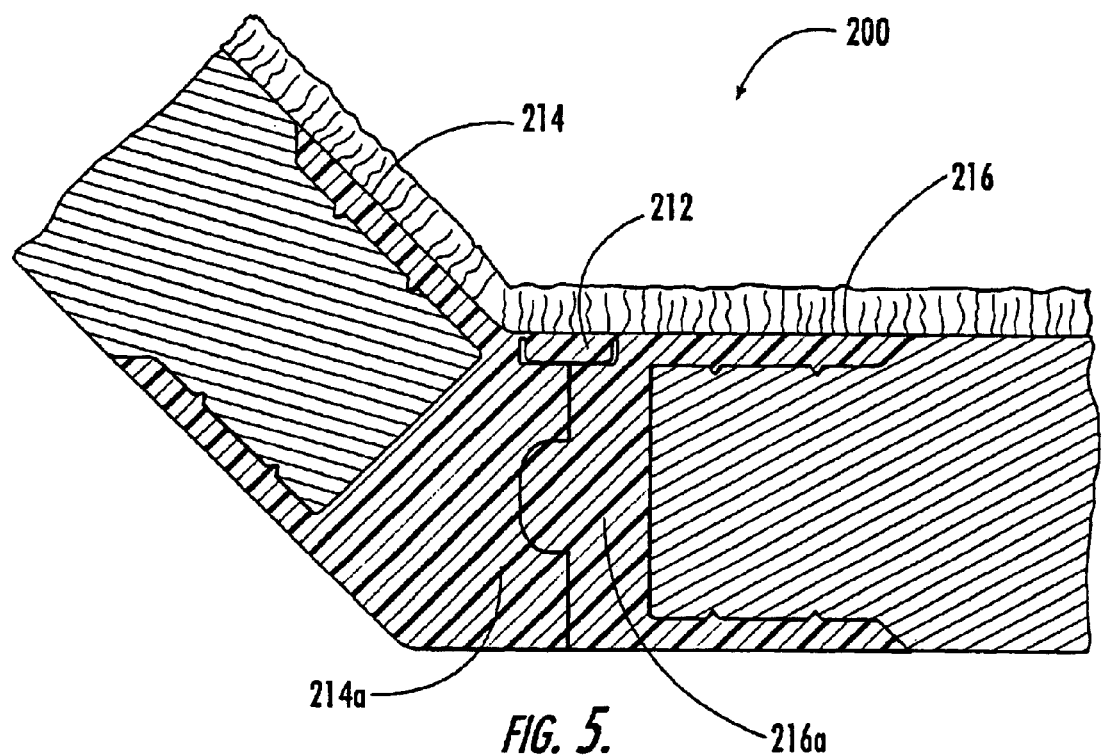
FIG. 5 is a side elevational view of a hinge apparatus according to embodiments of the present invention, wherein the hinge members are in respective first positions.
Figure 6:
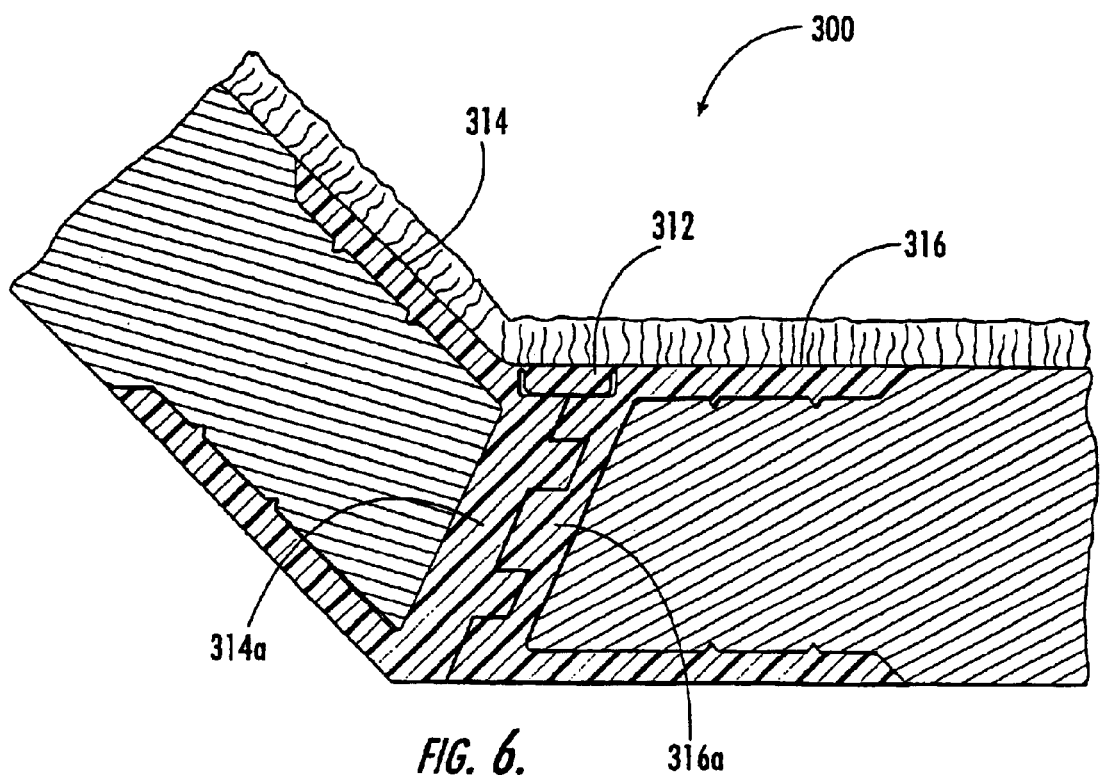
FIG. 6 is a side elevational view of a hinge apparatus according to embodiments of the present invention, wherein the hinge members are in respective first positions.

Hinge apparatus according to embodiments of the present invention, may be utilized with floor panels that are not substantially coplanar, but that are at an angle relative to each other. FIGS. 5–6 illustrate hinge apparatus 200, 300, respectively, that are utilized with angled floor panels. Hinge apparatus 200, 300 each have respective bridge members 212, 312 that are similar in configuration as described above with respect to FIGS. 1–4. Each hinge member 214, 216 (FIG. 5) and 314, 316 (FIG. 6) is pivotally connected to an edge portion of a respective bridge member 212, 312 as described above with respect to bridge member 12. In the illustrated embodiment of FIG. 5, the base members 214a, 216a of the hinge members 214, 216 interlock with each other at a single location. In the illustrated embodiment of FIG. 6, the base members 314a, 316a of the hinge members 314, 316 interlock with each other at two locations.

In the embodiments of FIGS. 5–6, only one hinge member (216, 316) has an upper panel surface that is coplanar with the bridge member (212, 312) when the hinge member (216, 316) is in a first position. Hinge apparatus according to embodiments of the present invention may have various shapes, sizes, and configurations without limitation.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A vehicle floor system, comprising:
    a hinge apparatus, comprising:
        an elongated, planar bridge member, comprising opposite first and second edge portions and a surface; and
        opposite first and second hinge members, each pivotally connected to a respective one of the first and second edge portions of the bridge member,
    wherein each hinge member comprises:
        a base member; and
        a planar upper panel extending outwardly from the base member, wherein each upper panel comprises opposite first and second surfaces;
    wherein each hinge member is movable between a first position and a second position, and wherein the base members of the hinge members are in adjacent, contacting relationship when the first and second hinge members are both in the first position;
    a pair of floor panels, each secured to the second surface of a respective one of the hinge member upper panels; and
    a floor covering material supported by the floor panels, by the first surface of each upper panel, and by the bridge member surface.

2. The vehicle floor system of claim 1, wherein the floor covering material comprises carpet.

3. The vehicle floor system of claim 2, wherein the carpet comprises a pile having a dimension and wherein a width of the bridge member between the first and second edge portions is at least twice the pile dimension.

4. The vehicle floor system of claim 2, wherein the carpet comprises a pile having a compressed dimension and wherein a width of the bridge member between the first and second edge portions is at least twice the pile compressed dimension.

5. The vehicle floor system of claim 1, wherein the upper panel first surface of a hinge member is substantially flush with the bridge member surface when the hinge member is in the first position.

6. The vehicle floor system of claim 1, wherein the base members of the hinge members interlock with each other when the first and second hinge members are both in the first position.

7. The vehicle floor system of claim 1, wherein each hinge member comprises a lower panel that extends outwardly from the base member in spaced-apart, opposing relationship with the upper panel, and wherein the upper and lower panels of each hinge member are configured to removably secure a respective one of the floor panels therebetween.

8. The vehicle floor system of claim 1, wherein the second surface of each upper panel comprises one or more projections that that facilitate securing a floor panel to the upper panel.

9. The vehicle floor system of claim 7, wherein the lower panel of each hinge member comprises opposite first and second surfaces, and wherein the first surface of each lower panel comprises one or more projections that facilitate securing a floor panel to the lower panel.

10. The vehicle floor system of claim 1, wherein the lower panels of the hinge members are substantially coplanar when the first and second hinge members are both in the first position.

11. The vehicle floor system of claim 1, wherein the upper panel of each hinge member comprises a tapered free end.

12. The vehicle floor system of claim 7, wherein the lower panel of each hinge member comprises a tapered free end.

13. The vehicle floor system of claim 1, wherein each hinge member is pivotally attached to a bridge member edge portion via a web of material having a thickness of less than about 1 millimeter (mm).

14. The vehicle floor system of claim 7, wherein each hinge member is pivotally attached to a bridge member edge portion via a web of material having a thickness of less than about 1 millimeter (mm).

15. The vehicle floor system of claim 1, wherein the upper panel of each hinge member is substantially coplanar with the bridge member when in the first position, and wherein the upper panel of each hinge member is transverse to the bridge member when in the second position.

* * * * *